(12) United States Patent
Hirose

(10) Patent No.: US 11,824,401 B2
(45) Date of Patent: Nov. 21, 2023

(54) STATOR CORE WITH ADJUSTABLE PRESS-FIT FORCE TO MOTOR CASE AND MOTOR WITH THE STATOR CORE

(71) Applicant: SHINANO KENSHI KABUSHIKI KAISHA, Nagano (JP)

(72) Inventor: Yo Hirose, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 95 days.

(21) Appl. No.: 17/365,107

(22) Filed: Jul. 1, 2021

(65) Prior Publication Data

US 2022/0052568 A1    Feb. 17, 2022

(30) Foreign Application Priority Data

Aug. 11, 2020   (JP) ................. 2020-135655

(51) Int. Cl.
   *H02K 1/16*   (2006.01)
(52) U.S. Cl.
   CPC ..................... *H02K 1/16* (2013.01)
(58) Field of Classification Search
   CPC .......... H02K 1/16; H02K 1/185; H02K 1/146; H02K 2213/03
   See application file for complete search history.

(56) References Cited

U.S. PATENT DOCUMENTS

| 10,284,030 B2 | 5/2019 | Nigo et al. | |
| 10,291,084 B2 * | 5/2019 | Utsumi | H02K 15/022 |
| 10,348,163 B2 * | 7/2019 | Lin | H02K 1/148 |
| 2006/0071572 A1 * | 4/2006 | Kunkel | H02K 15/02 310/216.004 |
| 2016/0241092 A1 | 8/2016 | Nigo et al. | |
| 2016/0301266 A1 * | 10/2016 | Seo | H02K 1/14 |

FOREIGN PATENT DOCUMENTS

| CN | 106549514 | 3/2017 |
| JP | H9-252557 | 9/1997 |
| JP | 2011-12667 | 1/2011 |
| JP | 2016-100911 | 5/2016 |
| JP | 2017-51037 | 3/2017 |
| JP | 6293382 | 3/2018 |
| JP | 2018-88796 | 6/2018 |
| WO | WO-2020/017625 | 1/2020 |

OTHER PUBLICATIONS

Office Action dated Apr. 12, 2022 in Japanese Application No. 2020-135655.
Office Action dated May 27, 2023 in Chinese Application No. 202110902210.X.

* cited by examiner

*Primary Examiner* — Bernard Rojas
(74) *Attorney, Agent, or Firm* — Stephen J. Weyer, Esq.; Stites & Harbison, PLLC

(57) ABSTRACT

In the stator core, recessed surface portions uniformly recessed toward an inner side in a radial direction over a range wider than a width of each of pole teeth are respectively formed on an outer peripheral surface where an annular back yoke and each of the pole teeth provided to protrude on the inner side in the radial direction cross each other.

4 Claims, 5 Drawing Sheets

CROSS SECTION Y-Y

CROSS SECTION Y-Y

CROSS SECTION Y1-Y1

CROSS SECTION Y2-Y2

STATOR CORE WITH ADJUSTABLE PRESS-FIT FORCE TO MOTOR CASE AND MOTOR WITH THE STATOR CORE

CROSS-REFERENCE TO RELATED APPLICATION

This application is based upon and claims the benefit of priority of the prior Japanese Patent Application No. 2020-135655, filed on Aug. 11, 2020, and the entire contents of which are incorporated herein by reference.

TECHNICAL FIELD

The present invention relates to a stator core in which, for example, electromagnetic steel sheets are laminated, and a motor including the stator core.

BACKGROUND ART

A stator core (laminated core) is manufactured by laminating and pressing punched electromagnetic steel sheets so that teeth (pole teeth) are provided to protrude from an annular back yoke in a radial direction. As shown in FIGS. 4A and 4B, match marks 53 are provided to be recessed toward an inner side in the radial direction on an outer peripheral surface 52a of a back yoke 52 in a stator core 51. Specifically, the match marks 53 are provided in a recessed shape on the outer peripheral surface of the back yoke 52 where center lines in the radial direction of the teeth (pole teeth) 54 cross the back yoke 52. In a process of laminating the electromagnetic steel sheets, a burr surface is formed in one direction at a peripheral edge portion by pressing; therefore, the electromagnetic steel sheets are laminated by rotating the sheets by 60 degrees, for example, in 6-pole teeth for preventing lamination thickness from being biased. At this time, the match marks 53 are used for positioning the electromagnetic steel sheets to one another. The match marks 53 are also formed by pressing, which are punched in a direction opposite to a direction in which the back yoke 52 and the teeth (pole teeth) 54 are formed for preventing warpage of the electromagnetic steel sheets. Specifically, the match marks 53 are formed by punching the electromagnetic steel sheets, then, the back yoke 52 and the teeth (pole teeth) 54 are formed by being punched in the opposite direction. A difference between a sag surface 55a and a burr surface 55b formed at the time of punching an electromagnetic steel sheet 55 is shown in a schematic view of FIG. 4C. An edge G with a pointed tip portion is formed on the burr surface 55b side.

As a configuration including a groove portion on an outer periphery of the back yoke, the groove portion is provided on the outer periphery of the back yoke on a central axis connecting a central position of a stator core and the center of a magnetic-pole tooth for holding the core at the time of producing the stator core (refer to PTL 1: JP-A-2019-13145).

SUMMARY OF INVENTION

Technical Problem

FIGS. 4D and 4E are a cross-sectional view taken along a direction of arrows Y1-Y1, and a cross-sectional view taken along a direction of arrows Y2-Y2 of the back yoke 52 in FIG. 4B. As shown in FIG. 4D, the stator core 51 is assembled into a motor case 56 from the sag surface 55a side of the back yoke 52 by press-fitting. At this time, a direction of the burr surfaces 55b at a boundary part between the back yoke 52 and the match mark 53 in the stator core 51 is opposite to each other as shown in FIG. 4E. A direction in which the match marks 53 are punched and a direction in which external forms of the back yoke 52 and the teeth (pole teeth) 54 are punched are opposite; the sag surfaces 55a are pulled by the adjacent burr surfaces 55b and the edges G on the match mark 53 side are formed in a pointed state in a press-fitting direction. Accordingly, when the stator core 51 is press-fitted to the motor case 56, press-fit force becomes unstable due to resistance of the edge G. Furthermore, when press-fit burr is formed on a press-fit surface, a posture of the stator core 51 becomes unstable and positional deviation may occur, and deformation may occur or core loss may be increased in the stator core 51. Moreover, scratches may occur on the press-fit surface of the motor case 56 due to the edges G, or metal powder scraped from the press-fit surface may fall and adhere to magnets, which may generate abnormal noise or may cause short-circuit.

As shown in FIG. 4A, the stator core 51 is press-fitted so that the entire periphery of the back yoke 52 except the match marks 53 becomes a press-fit surface with respect to the motor case 56. When the stator core 51 is press-fitted to the motor case 56, the force of tightening the stator core 51 toward the inner side in the radial direction acts on the stator core 51 as shown in FIG. 5B. Back yokes 52a1 to which the teeth 54 are connected have higher rigidity than back yokes 52a2 in which the teeth 54 are not provided as shown in FIG. 5A. Accordingly, the stress by press-fitting of the stator core 51 is concentrated on crossing parts between shaft portions of the teeth 54 and the back yoke 52 as shown by circles in FIG. 5B. FIG. 5C illustrates the flow of magnetic fluxes formed in the teeth 54, showing a portion where the stress is concentrated by a hatched area. As described above, when the stress is concentrated on the crossing parts between the teeth 54 and the back yoke 52, a composition of the electromagnetic steel sheets is deformed, the magnetic fluxes does not flow easily, and the core loss tends to be increased. Moreover, the entire periphery of the back yoke 52 becomes the press-fit surface; therefore, the press-fit force tends to be high, deformation of the stator core 51 and core loss due to the excessive press-fit force are increased, which causes the reduction of motor efficiency.

Solution to Problem

In response to the above issue, one or more aspects of the present invention are directed to a stator core having the stable press-fit force without being excessive by adjusting the press-fit force to the motor case and capable of preventing deformation and generation of metal powder due to press-fitting, and suppressing the increase of core loss, and directed to a motor with good assemblability and capable of maintaining motor performance by using the above stator core.

In view of the above, the following embodiments are described below.

A stator core is formed by laminating and pressing a plurality of electromagnetic steel sheets, in which a plurality of pole teeth are provided to protrude at predetermined intervals in an annular back yoke toward the center in a radial direction, and recessed surface portions uniformly recessed toward an inner side in the radial direction over a range wider than a width of each of pole teeth are respectively formed on an outer peripheral surface where the annular back yoke and each of the pole teeth provided to protrude on the inner side in the radial direction cross each other.

According to the above, the recessed surface portions uniformly recessed toward the inner side in the radial direction over the range wider than the width of each of the pole teeth are respectively formed on the outer peripheral surface where the annular back yoke and each of the pole teeth cross each other; therefore, stress concentration does not easily occur at crossing parts between the pole teeth and the back yoke at the time of press-fitting the stator core into a motor case. As a result, deformation of the stator core does not occur, the press-fit force does not become excessive and becomes stable, and further, deformation and the increase of core loss caused by press-fitting can be suppressed.

It is preferable that match marks further recessed toward the inner side in the radial direction are formed on the respective recessed surface portions formed on the outer peripheral surface of the annular back yoke, that a one-end peripheral edge portion in a thickness direction forming an external form of the stator core is formed by a sag surface except the match marks, and the other-end peripheral edge portion is formed by a burr surface, and that a one-end peripheral edge portion in the thickness direction of the match marks is formed by the burr surface and the other-end peripheral edge portion is formed by the sag surface.

Accordingly, even when the stator core is press-fitted into the motor case so that the sag surface formed on the one-end peripheral edge portion in the thickness direction enters first, the burr surface provided on the one-end peripheral edge portion in the thickness direction of the match mark is formed on the further inner side in the radial direction than the recessed surface portion; therefore, edges of the burr surfaces do not create resistance at the time of press-fitted into the motor case, and the press-fit force becomes stable. Assembly is realized with a stable posture of the stator core, and positional deviation and deformation of the stator core do not occur.

Moreover, occurrence of scratches on the motor case or generation of metal powder scraped from the press-fit surface by the burr surfaces of the match marks can be prevented; therefore, motor performance is not reduced.

It is preferable that the plurality of electromagnetic steel sheets are rotationally laminated at a predetermined angle so as to align the match marks.

Accordingly, the electromagnetic steel sheets can be laminated while preventing the thickness of the core from being uneven or from being leaned due to variation in plate thickness of the electromagnetic steel sheets, and while positioning the pole teeth respectively.

It is preferable that the recessed surface portions are provided at positions corresponding to the pole teeth at equal intervals, and that each of the match marks is provided at a crossing position between a center line in the radial direction connecting a central position of the annular back yoke and the center of the pole tooth and the recessed surface portion.

Accordingly, the plural electromagnetic steel sheets can be laminated with accurate positioning (positioning in a circumferential direction and in the radial direction) between the back yokes and the pole teeth to one another only by aligning the match marks when the plural electromagnetic steel sheets are rotationally laminated.

A motor includes a stator having the stator core according to any one of the above, a motor case into which the stator core is press-fitted from the sag-surface side formed on a one-end peripheral edge portion in a thickness direction, and a rotor in which a rotor shaft is rotatably supported by the motor case and rotor magnetic poles are arranged to face the pole teeth of the stator core.

Accordingly, the press-fit force becomes stable at the time of press-fitting the stator core into the motor case, and deformation and generation of metal powder due to press-fitting do not occur; therefore, motor performance can be maintained with good assemblability without increasing core loss.

Advantageous Effects of Invention

According to the above, it is possible to provide a stator core in which the press-fit force to the motor case becomes stable, deformation and generation of metal powder due to press-fitting do not occur, and which can be accurately assembled to the motor case.

It is also possible to provide a motor with good assemblability and capable of maintaining motor performance by using the above stator core.

DESCRIPTION OF EMBODIMENTS

Hereinafter, a stator core and a motor using the same according to an embodiment of the present invention will be explained with reference to the attached drawings. First, a schematic configuration of a motor will be explained with reference to FIG. 2.

Figure 2:
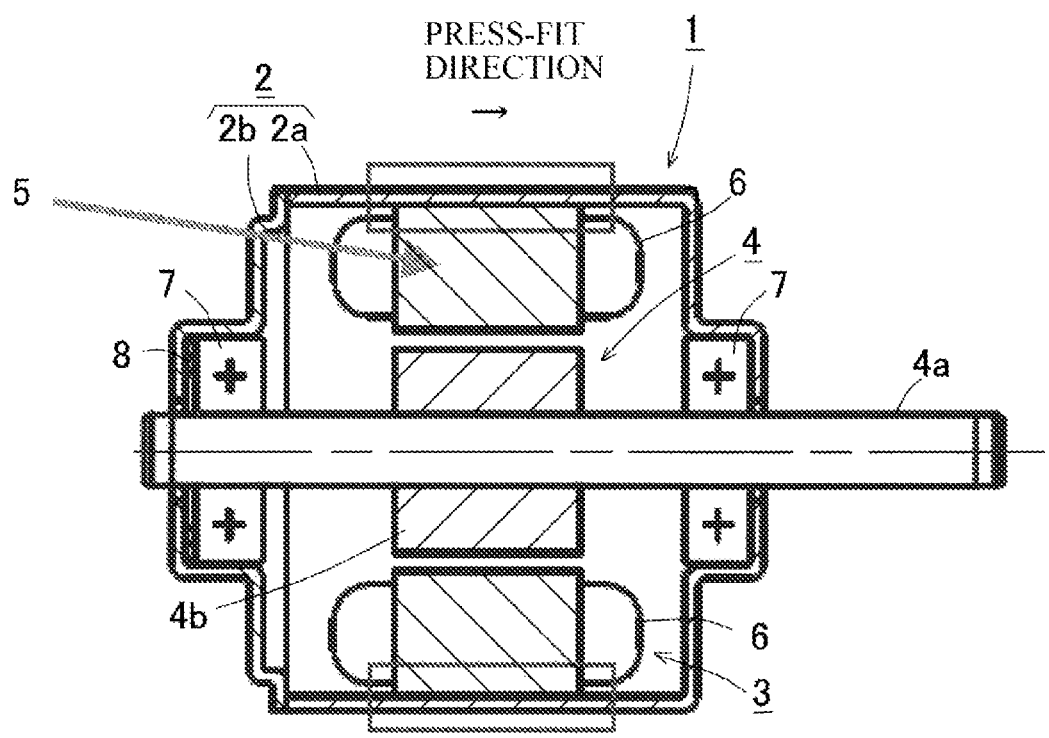
FIG. 2 is a sectional view of a motor to which the stator core of FIG. 1A is assembled.

In FIG. 2, a motor 1 includes the following configuration. A motor case 2 includes a case body 2a and a rear cover 2b. The motor case 2 is formed of a metal material, for example, galvanized steel sheets or the like. A stator 3 and a rotor 4 are provided inside the motor case 2.

The stator 3 is assembled so that a stator core 5 is press-fitted into the case body 2a.

Figure 1A:
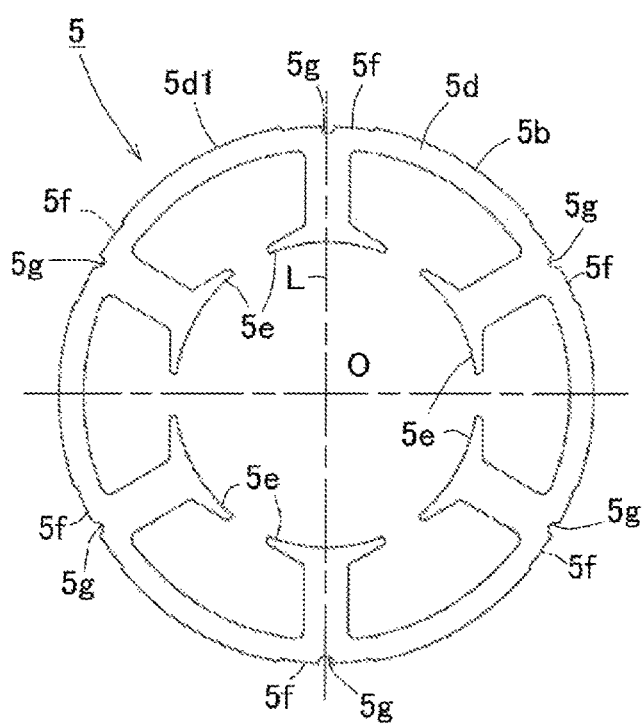
FIG. 1A is a plan view of a stator core.
Figure 1B:
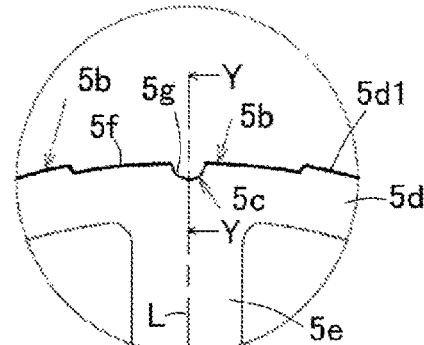
FIG. 1B is a partially-enlarged plan view thereof.
Figure 1C:
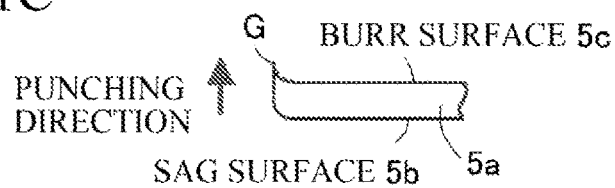
FIG. 1C is an explanatory view for an electromagnetic steel sheet.

The stator core 5 is press-formed as shown in FIG. 1C. A plurality of electromagnetic steel sheets 5a in which a sag surface 5b and a burr surface 5c are respectively formed are laminated so that edges G from the sag surfaces 5b to the burr surfaces 5c are aligned to the same direction, being caulked to thereby form the stator core 5 shown in FIG. 1A.

In FIG. 1A, a plurality of pole teeth 5e (for example, six places) are provided to protrude in an annular back yoke 5d toward the center in a radial direction at predetermined intervals (for example, at 60 degrees in a circumferential direction) in the stator core 5. On an outer peripheral surface 5d1 of the annular back yoke 5d, recessed surface portions 5f recessed toward the inner side in the radial direction are formed at predetermined intervals. Moreover, match marks 5g further recessed in the inner side in the radial direction are formed in the respective recessed surface portions 5f. Each match mark 5g is formed into a shape, for example, recessed in a semicircular shape toward the inner side in the radial direction.

One-end peripheral edge portion in a thickness direction forming an external form of the stator core 5 is formed by the sag surface 5b except the match marks 5g, and the other-end peripheral edge portion is formed by the burr surface 5c. After the match marks 5g are formed by being punched, the back yoke 5d (including the recessed surface portions 5e) and the pole teeth 5e are formed by being punched in an opposite direction for preventing warpage of the electromagnetic steel sheets 5a. That is, a one-end peripheral edge portion in the thickness direction of the match marks 5g is formed by the burr surface 5c, and the other-end peripheral edge portion is formed by the sag surface 5b. Accordingly, in the one-end peripheral edge portion in the thickness direction shown in FIG. 1B, both the outer peripheral surface 5d1 and the recessed surface portion 5f of the back yoke 5d are formed by the sag surface 5b, and the match mark 5g is formed by the burr surface 5c. As the match marks 5g and the back yoke 5d/the pole teeth 5e are formed by punching the electromagnetic steel sheets 5a in the opposite directions, the edges G on the match mark 5g side are formed in a pointed state in the press-fit direction at a boundary part between the sag surface 5b of the recessed surface portion 5f and the adjacent burr surface 5c of the match mark 5g; however, the edge G does not affect the assembly of the stator core 5 into the motor case 2, which will be described later.

It is desirable that the plural electromagnetic steel sheets 5a are rotationally laminated at a predetermined angle (for example, 60 degrees) so as to align the match marks 5g. Accordingly, the electromagnetic steel sheets 5a can be laminated while preventing the thickness of the stator core 5 from being uneven or from being leaned due to variation in plate thickness of the electromagnetic steel sheets 5a, and while positioning the pole teeth 5e respectively.

The recessed surface portions 5f are provided at equal intervals (six places) at positions corresponding to the pole teeth 5e, and each match mark 5g is provided at a position where a center line L in the radical direction connecting a central position "O" of the annular back yoke 5d and the center of each pole tooth 5e crosses the recessed surface portion 5f. Accordingly, the plural electromagnetic steel sheets 5a can be laminated with accurate positioning between the back yokes 5d and the pole teeth 5e to one another only by aligning the match marks 5g when the plural electromagnetic steel sheets 5a are rotationally laminated.

As shown in FIG. 2, the pole teeth 5e are covered with not-shown insulators, and coils 6 are wound through the insulators in the stator core 5.

The rotor 4 is formed so that rotor magnetic poles 4b are integrally assembled around a rotor shaft 4a in FIG. 2. The rotor shaft 4a is rotatably supported by rolling bearings 7 assembled to the case body 2a and the rear cover 2b forming the motor case 2 respectively. The rotor magnetic poles 4b are assembled to face magnetic-flux action surfaces of the pole teeth 5e. It is also preferable that preload is added in the axial direction of the rolling bearing 7 provided in the rear cover 2b by a preload spring 8.

Figure 1D:
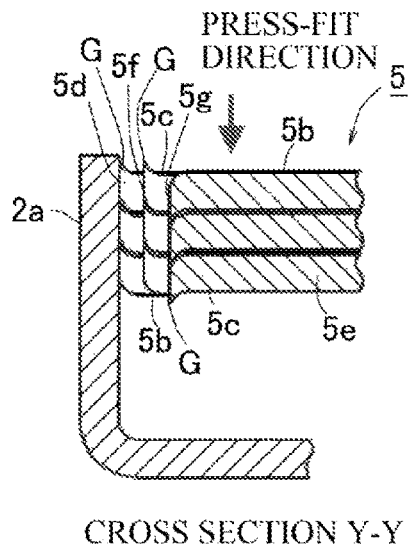
FIG. 1D is a cross-sectional view along a direction of arrows Y-Y for explaining a press-fitting state of the stator core with respect to a motor case.

The above stator core 5 is press-fitted into an opening of the case body 2a from which the rear cover 2b is removed in FIG. 2 in an arrow direction from the sag surface 5b side of the back yoke 5d and the recessed surface portion 5f (see FIG. 1C). Portions surrounded by squares in FIG. 2 indicate portions where the stator core 5 is press-fitted into the case body 2a. Specifically, the stator core 5 is press-fitted into the case body 2 so that the sag surface 5b side formed in the one-end peripheral edge portion in the thickness direction of the back yoke 5d and the recessed surface portion 5f of the stator core 5 enters first as shown in FIG. 1D. At this time, the burr surface 5c provided in the one-end peripheral edge portion in the thickness direction of the match mark 5g is formed on the inner side in the radial direction than the recessed surface portion 5f. Even when there exists the edge G of the burr surface 5c at the boundary part between the recessed surface portion 5f and the edge mark 5g, the recessed surface portion 5f is provided on the inner side in the radial direction than the outer peripheral surface of the back yoke 5d; therefore, the edge G of the burr surface 5c does not create resistance at the time of press-fitted into the case body 2a, and the press-fit force becomes stable, as a result, the posture of the stator core 5 becomes stable at the time of assembling, and positional deviation or deformation of the stator core 5 does not occur.

Moreover, occurrence of scratches or generation of metal powder scraped from the press-fit surface on the case body 2a by the burr surfaces 5c at the match marks 5g can be prevented; therefore, motor performance is not reduced.

According to the above, the press-fit force becomes stable at the time of press-fitting the stator core 5 into the motor case 2, and deformation and generation of metal powder due to press-fitting do not occur in the motor 1 shown in FIG. 2; therefore, motor performance can be maintained with good assemblability without increasing core loss.

Figure 3C:
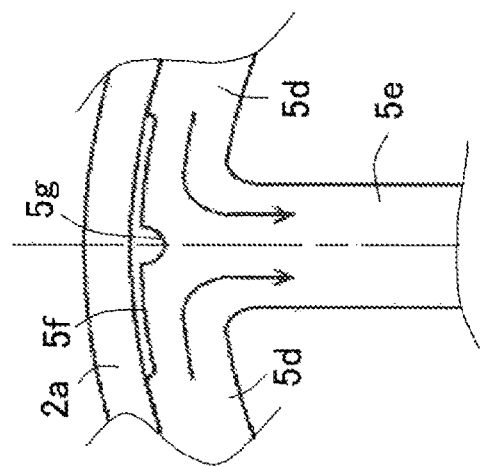
FIGS. 3A to 3C are explanation views for explaining occurrence of deformation at the time of press-fitting the stator core into the motor case.
Figure 3B:
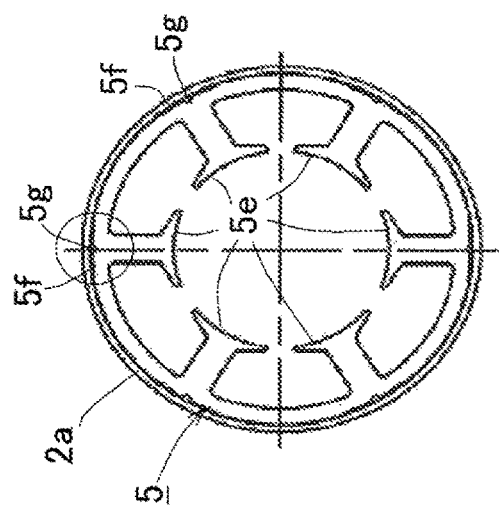
Figure 3A:
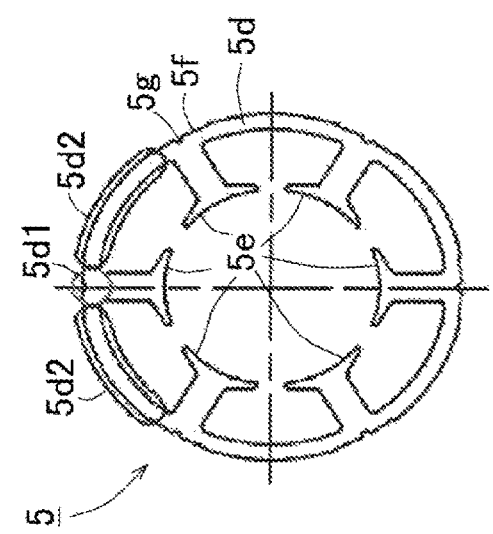
Figure 4A:
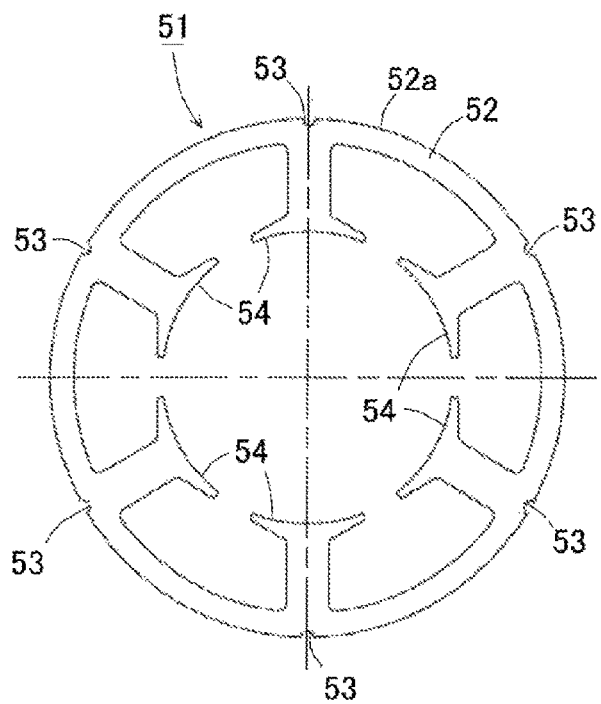
FIG. 4A is a plan view of a related-art stator core.
Figure 4B:
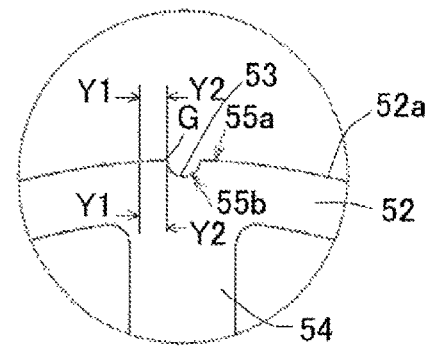
FIG. 4B is a partially-enlarged plan view thereof.
Figure 4C:
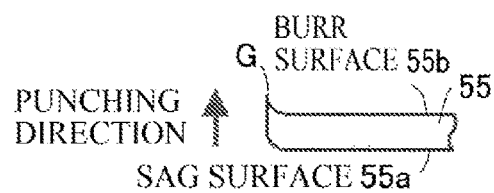
FIG. 4C is an explanatory view for an electromagnetic steel sheet.
Figure 4D:
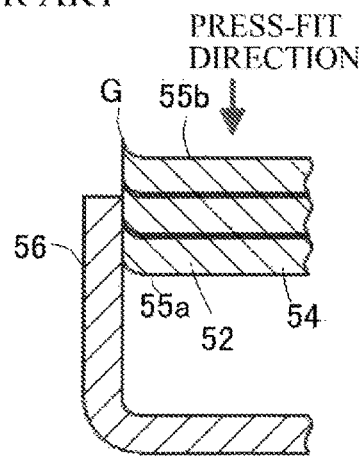
FIG. 4D is a cross-sectional along a direction of arrows Y1-Y1 for explaining a press-fitting state of the stator core with respect to a motor case.
Figure 4E:
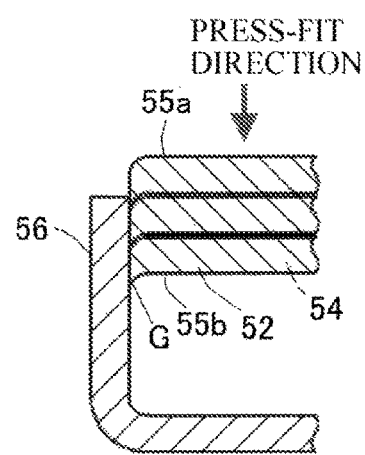
FIG. 4E is a cross-sectional view along a direction of arrows Y2-Y2 for explaining a press-fitting state of the stator core with respect to the motor case.
Figure 5C:
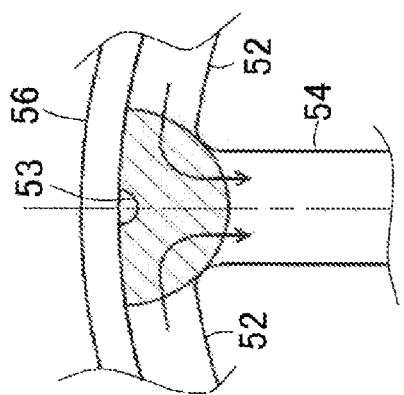
FIGS. 5A to 5C are explanatory views showing relation between occurrence of stress concentration and increase of core loss at the time of press-fitting the related-art stator core into the motor case.
Figure 5B:
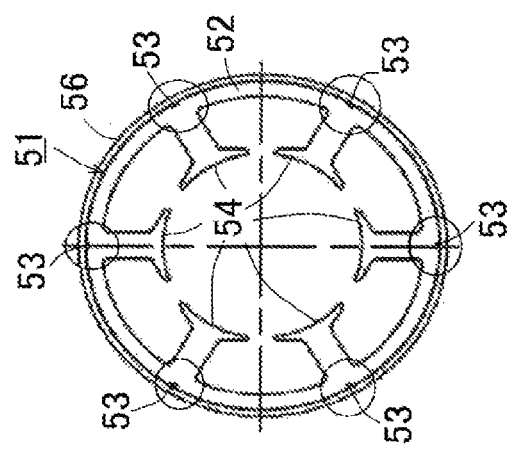
Figure 5A:
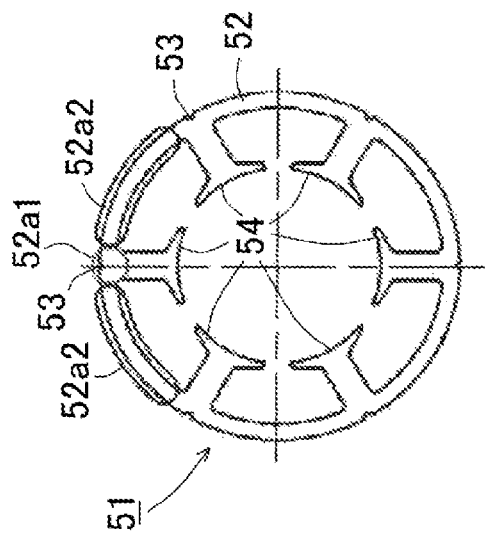

As shown in FIG. 3A, the outer peripheral surface of the back yoke 5d except the match marks 5g and the recessed surface portions 5f in the stator core 5 is press-fitted into the case body 2a. When the stator core 5 is press-fitted into the case body 2a as shown in FIG. 3B, the force of tightening the stator core 5 toward the inner side in the radial direction acts on the stator core 5. However, the recessed surface portion 5f uniformly recessed toward the inner side in the radial direction over a range wider than a width of each of the pole teeth 5e is respectively formed on the outer peripheral surface of the stator core 5 at a crossing part between the back yoke 5d and each of the pole teeth 5e as shown in FIG. 3C that is a partially enlarged view of a circle in FIG. 3B. Accordingly, rigidity is reduced, and the stress due to press-fitting of the stator core 5 is not concentrated on crossing parts between shaft portions of the pole teeth 5e and the back yoke 5d (boundary parts between 5d1 and 5d2 in FIG. 3A). FIG. 3C illustrates the flow of magnetic fluxes formed at the pole tooth 5e. As described above, the stress concentration does not occur at the crossing parts between the pole teeth 5e and the back yoke 5d; therefore, a composition of the electromagnetic steel sheets 5a is not deformed and the magnetic fluxes flow smoothly, which does not increase core loss. Moreover, the entire periphery of the back yoke 5d is not the press-fit surface with respect to the case body 2a; therefore, the press-fit force is adjusted to be optimum, and the motor performance can be maintained without occurrence of deformation of the stator core 5 and without reducing motor efficiency due to the increase of core loss caused by excessive press-fit force.

As described above, it is possible to provide the stator core 5 in which the press-fit force to the motor case 2 is stable, and deformation or metal powder caused by press-fitting does not occur, and which is assembled to the motor case 2 with accuracy. When using the above stator core 5, the motor 1 with good assemblability and capable of maintaining motor performance can be provided.

In the above embodiment, stator core 5 of a 6-poles and 6-slots type is used as an example; however, the stator core 5 is not limited to this. The number of pole teeth and the number of slots may be larger as well as smaller than the above.

What is claimed is:

1. A stator core formed by laminating and pressing a plurality of electromagnetic steel sheets, in which a plurality of pole teeth are provided to protrude at predetermined intervals in an annular back yoke toward the center in a radial direction,
   wherein recessed surface portions uniformly recessed toward an inner side in the radial direction over a range wider than a width of each of pole teeth are respectively formed on an outer peripheral surface where the annular back yoke and each of the pole teeth provided to protrude on the inner side in the radial direction cross each other,
   wherein match marks further recessed toward the inner side in the radial direction are formed on the respective recessed surface portions,
   the match marks and the back yoke/the pole teeth are formed by punching the electromagnetic steel sheets in opposite directions,
   a one-end peripheral edge portion in a thickness direction forming an external form of the stator core is formed by a sag surface except the match marks, and the other-end peripheral edge portion is formed by a burr surface,
   a one-end peripheral edge portion in the thickness direction of the match marks is formed by the burr surface and the other-end peripheral edge portion is formed by the sag surface,
   edges on the match mark side are formed in a pointed state in a press-fit direction at a boundary part between the match mark and the recessed surface portion, and
   the plurality of electromagnetic steel sheets are rotationally laminated at a predetermined angle so as to align the match marks.

2. The stator core according to claim 1,
   wherein the recessed surface portions are provided at positions corresponding to the pole teeth at equal intervals, and
   each of the match marks is provided at a crossing position between a center line in the radial direction connecting a central position of the annular back yoke and the center of the pole tooth and the recessed surface portion.

3. A motor comprising:
   a motor case;
   a stator in which, by using the stator core according to claim 1, wherein recessed surface portions uniformly recessed toward an inner side in the radial direction over a range wider than a width of each of pole teeth are respectively formed on an outer peripheral surface where the annular back yoke and each of the pole teeth provided to protrude on the inner side in the radial direction cross each other, wherein match marks further recessed toward the inner side in the radial direction are formed on the respective recessed surface portions, and wherein the match marks and the back yoke/the pole teeth are formed by punching the electromagnetic steel sheets in opposite directions, the stator core is press-fitted into the motor case from the sag-surface side formed on the one-end peripheral edge portion in the thickness direction of the annular back yoke, and the edges on the match mark side are formed in a pointed state in the press-fit direction at the boundary part between the match mark and the recessed surface portion; the stator core according to claim 1 is press-fitted into the motor case from the sag-surface side formed on a one-end peripheral edge portion in a thickness direction; and
   a rotor in which a rotor shaft is rotatably supported by the motor case and rotor magnetic poles are arranged to face the pole teeth of the stator core.

4. A motor comprising:
   a motor case;
   a stator in which, by using the stator core according to claim 2, wherein recessed surface portions uniformly recessed toward an inner side in the radial direction over a range wider than a width of each of pole teeth are respectively formed on an outer peripheral surface where the annular back yoke and each of the pole teeth provided to protrude on the inner side in the radial direction cross each other, wherein match marks further recessed toward the inner side in the radial direction are formed on the respective recessed surface portions, and wherein the match marks and the back yoke/the pole teeth are formed by punching the electromagnetic steel sheets in opposite directions, the stator core is press-fitted into the motor case from the sag-surface side formed on the one-end peripheral edge portion in the thickness direction of the annular back yoke, and the edges on the match mark side are formed in a pointed state in the press-fit direction at the boundary part between the match mark and the recessed surface portion; the stator core according to claim 1 is press-fitted into the motor case from the sag-surface side formed on a one-end peripheral edge portion in a thickness direction; and
   a rotor in which a rotor shaft is rotatably supported by the motor case and rotor magnetic poles are arranged to face the pole teeth of the stator core.

\* \* \* \* \*